United States Patent [19]

Seager

[11] Patent Number: 5,235,561
[45] Date of Patent: Aug. 10, 1993

[54] WRISTWATCH RADIOTELEPHONE

[75] Inventor: Richard H. Seager, Mystic, Conn.

[73] Assignee: Timex Corporation, Middlebury, Conn.

[21] Appl. No.: 963,413

[22] Filed: Oct. 16, 1992

[51] Int. Cl.⁵ ............... G04B 47/00; G04B 37/00; H04M 1/05
[52] U.S. Cl. .................... 368/10; 368/13; 368/282; 379/90; 379/428
[58] Field of Search ........... 368/10, 13, 88, 276, 368/277, 278, 281, 282; 224/164, 165; 379/90, 428, 430

[56] References Cited

U.S. PATENT DOCUMENTS

| | | | |
|---|---|---|---|
| 2,780,050 | 2/1957 | Florman | 368/277 |
| 2,790,301 | 4/1957 | Dinstman | 368/277 |
| 3,032,651 | 5/1962 | Gisiger-Stahl et al. | 250/14 |
| 4,847,818 | 7/1989 | Olsen | 368/10 |
| 5,008,864 | 4/1991 | Yoshitake | 368/10 |

*Primary Examiner*—Vit W. Miska
*Attorney, Agent, or Firm*—Robert R. Jackson

[57] ABSTRACT

A wristwatch radiotelephone having rigid members slidably joined so that the members may be spread apart from a compact unit to an elongated apparatus of appropriate length for use as a radiotelephone. The rigid members house a radiotelephone speaker, microphone, display, dialing buttons, and control buttons. A wristwatch strap joins the free ends of the rigid members so that the rigid members may be worn around a wrist when arranged in a compact unit.

11 Claims, 2 Drawing Sheets

WRISTWATCH RADIOTELEPHONE

BACKGROUND OF THE INVENTION

This invention relates to a combined wristwatch and radiotelephone, and more particularly to a wristwatch which can be converted temporarily to a form suitable for use as a hand-held radiotelephone.

Olsen U.S. Pat. No. 4,847,818 shows a wristwatch which can be removed from the user's wrist and temporarily reconfigured for use as a hand-held radiotelephone. The Olsen apparatus has many desirable features, but it would also be desirable to have a structure which has a compact wristwatch band, yet also has a substantially rigid radiotelephone housing which forms substantially the same definite, predetermined shape each time the structure is reconfigured as a radiotelephone. This would provide a more comfortable fit as a wristwatch, yet tend to give the article a more substantial "feel" when used as a radiotelephone. The article thus may be more acceptable and attractive to at least some users.

In view of the foregoing, it is an object of this invention to provide a wristwatch radiotelephone which has a first compact configuration for use as a wristwatch, and a second elongated configuration for use as a radiotelephone.

It is a more particular object of this invention to provide a wristwatch radiotelephone which can be compacted into a shape suitable to be strapped around a wrist with a flexible wristwatch band when configured for use as a wristwatch, and which can be made to positively assume a substantially rigid predetermined elongated shape when configured for use as a radiotelephone.

SUMMARY OF THE INVENTION

These and other objects of the invention are accomplished in accordance with the principles of the invention by providing a wristwatch radiotelephone comprising a substantially rigid housing for a radiotelephone and a flexible wristwatch band. The housing, when collapsed, may be worn around the wrist, preferably as a wristwatch. The housing is expandable to a more convenient length for use as a radiotelephone.

Further features of the invention, its nature and various advantages will be more apparent from the accompanying drawings and the following detailed description of the preferred embodiments.

DETAILED DESCRIPTION OF THE PREFERRED EMBODIMENTS

Olsen U.S. Pat. No. 4,847,818, which is hereby incorporated by reference herein, shows all of the electronic components and circuitry needed for a wristwatch radiotelephone. All of those same components and circuitry can be used in a wristwatch radiotelephone constructed in accordance with the present invention. Accordingly, it will not be necessary to repeat here any of the details regarding that portion of the apparatus.

Figure 1:
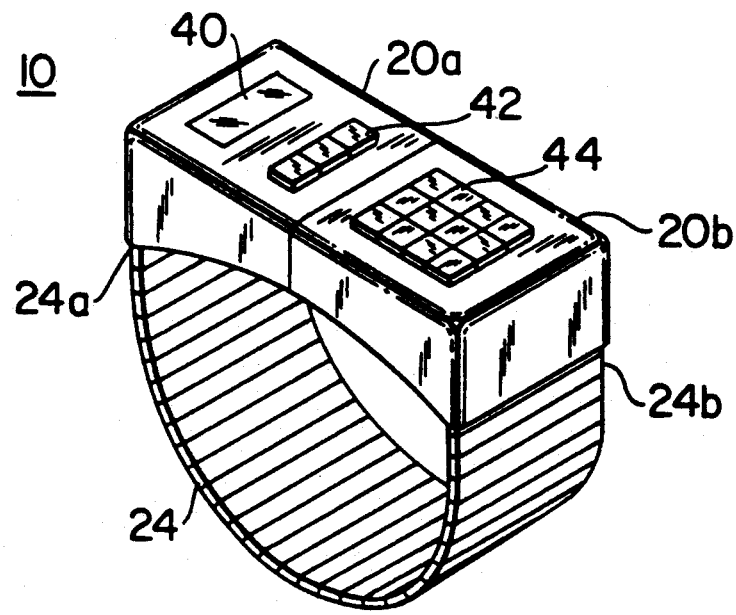
FIG. 1 is a simplified perspective view of an illustrative embodiment of a wristwatch radiotelephone constructed in accordance with the principles of this invention in the wristwatch configuration.

As shown in FIG. 1, an illustrative preferred embodiment of a wristwatch radiotelephone 10 constructed in accordance with this invention includes at least two main body members 20a and 20b and a wristwatch band 24 preferably made up of a plurality of links. When arranged as shown in FIG. 1, apparatus 10 closely resembles a conventional wristwatch. Main body member 20a includes a display 40 and timepiece and telephone control buttons 42, while main body member 20b includes telephone dialing buttons 44. Elements 40, 42, and 44 are respectively similar to elements 10-12 in the above-mentioned Olsen patent. Wristwatch band 24 may be any suitable band, either expandable, or of a fixed length and including a clasp for opening the band for removal. Preferably band 24 is approximately twice the total longitudinal length of members 20a and 20b.

Figure 2:
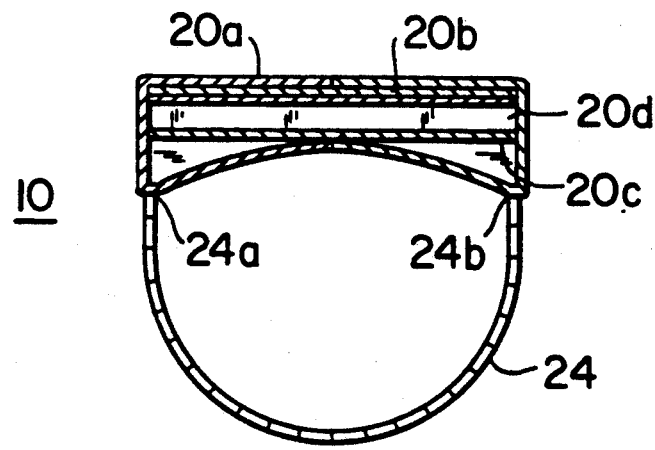
FIG. 2 is a simplified side and partly sectional view of the apparatus of FIG. 1.

A side and partly sectional view of apparatus 10 in the configuration of FIG. 1 is shown in FIG. 2. Main body members 20a and 20b are shown as having internal channels in which interior joining members 20c and 20d are housed. In the wristwatch configuration, members 20a and 20b abut one another and members 20c and 20d are enclosed and hidden by members 20a and 20b. Members 20c and 20d are telescopically related to members 20a and 20b and join the latter pair.

Figure 3:
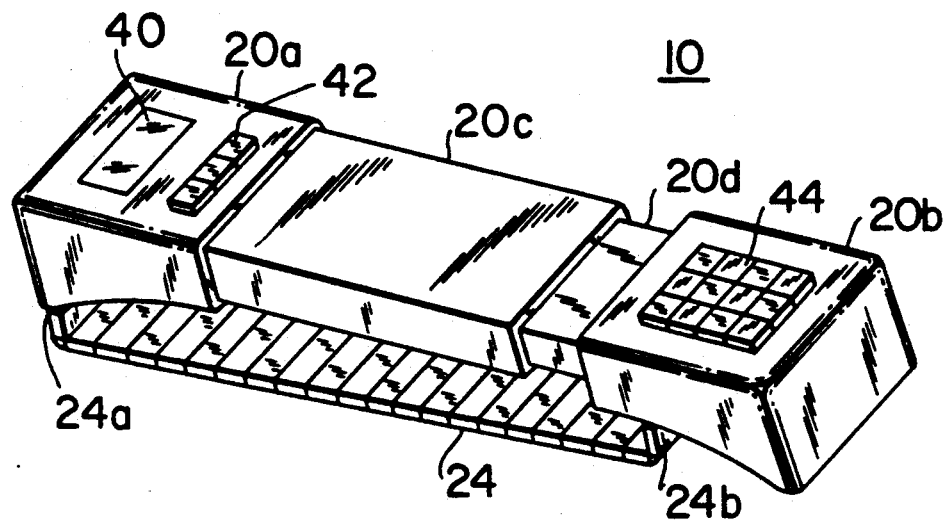
FIG. 3 is a simplified perspective view of the apparatus FIG. 1 opened out to the radiotelephone configuration.
Figure 4:
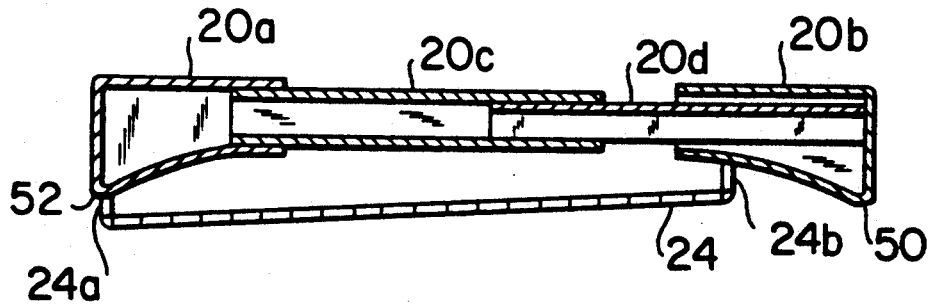
FIG. 4 is a simplified side and partly sectional view of the apparatus of FIG. 3.

When apparatus 10 is removed from the wrist, members 20a and 20b may be separated from one another to form the final, elongated, substantially straight arrangement shown in FIGS. 3 and 4. Preferably, when expanded, apparatus 10 is at least twice the length of the compact unit of FIGS. 1 and 2. Interior joining member 20c is slidably and telescopically joined to members 20a and 20b. If additional interior joining member 20d is used, then joining member 20c is releasably joined to member 20b such that in the fully extended form, members 20b and 20c are no longer in direct contact, but member 20b is still connected to member 20c via member 20d. Preferably slidable movement of member 20c with respect to member 20a is limited by a stop so that the members do not readily separate from one another when apparatus 10 is elongated into the radiotelephone configuration. Members 20a and 20c may also be provided with interengaging detents which tend to maintain members 20a and 20c in either a collapsed or extended relation. Alternatively, friction between members 20a and 20c may perform this function.

Interior joining members 20c and 20d are slidably and telescopically joined to one another. Inner member 20d may be fixedly joined to member 20b so that separating member 20b from member 20a automatically pulls member 20d away from member 20a as well. Movement of members 20c and 20d with respect to one another is preferably limited by a stop such that the members do not readily separate from one another. Pulling on member 20b and consequently member 20d thus would also result in pulling member 20c out from within member 20a. Members 20c and 20d may also be provided with interengaging detents which tend to maintain members 20c and 20d in either a collapsed or extended relation. Again, friction between members 20c and 20d may alternatively perform this function.

End 24a of band 24 is attached to the free end of member 20a. Such attachment may be fixed if band 24 is expandable, or releasable if band 24 is of a fixed length. End 24b of band 24 is attached to the free end of member 20b. Preferably such attachment is slidable so that as members 20a and 20b are separated, end 24b of band 24 moves towards the inner end of member 20b to allow for elongation of apparatus 10 without interference by the limited length of band 24.

When apparatus 10 has been rearranged to the elongated configuration shown in FIGS. 3 and 4 and the user holds the apparatus in one hand along one side of his or her face, a radiotelephone microphone 50 preferably on member 20b and a radiotelephone speaker 52 preferably on member 20a are spaced apart and otherwise positioned and oriented for simultaneous use adjacent the user's mouth and ear, respectively. Elements 50 and 52 are respectively similar to elements 6 and 8 in the above-mentioned Olsen patent. Preferably, the expanded apparatus 10 is at least twice as long as the compact apparatus 10.

Because the means for joining members 20a and 20b allows apparatus 10 to assume a compact form, a comfortable wristwatch band 24 may be used when members 20a and 20b abut one another in the wristwatch configuration. Additionally, such rigid members for housing the radiotelephone allow apparatus 10 to positively assume substantially the same predetermined shape each time it is expanded into the radiotelephone configuration. Band 24 remains taut when members 20 are drawn apart. Preferably band 24 is somewhat spaced from expanded members 20 so that apparatus 10 assumes greater depth when expanded, thereby giving the apparatus a more substantial "feel."

It will be understood that the foregoing is merely illustrative of the principles of this invention, and that various modifications can be made by those skilled in the art without departing from the scope and spirit of the invention. For example, elements 40, 42, 44, 50, and 52 can be placed in any desired locations on the apparatus. Moreover, additional joining members may be used to allow for expansion of apparatus 10 to a longer resultant length. The present embodiments are described for the purpose of illustration rather than limitation, and the present invention is limited only by the claims which follow.

What is claimed is:

1. Apparatus which is convertible between a first configuration adapted for wearing around the wrist as a wristwatch and a second configuration in which said apparatus is suitable for use as a hand-held radiotelephone with a microphone and speaker adjacent respective opposite ends of said elongated shape, said apparatus comprising:
   at least two substantially rigid members each having an interior channel, wherein said rigid members form a compact unit wearable around a wrist when in said first configuration, said unit having a first free end and a second free end;
   joining means positioned in said interior channels of said rigid members, wherein said rigid members may be drawn apart along said joining means to expand said apparatus into said second configuration; and
   a flexible member joining said first and second free ends of said compact unit to secure said compact unit around a wrist.

2. The apparatus defined in claim 1 wherein said joining means is substantially rigid and said rigid members are slidably joined to said joining means.

3. The apparatus defined in claim 2 wherein said joining means further comprises an outer member and an inner member slidably joined to said outer member to allow for further separation of said rigid members from one another in said second configuration.

4. The apparatus defined in claim 3 wherein:
   said rigid members comprise first and second rigid members;
   said outer member of said joining means is slidably joined to said first rigid member and releasably joined to said second rigid member;
   movement of said outer member with respect to said first rigid member is limited so that in said second configuration said outer member remains joined to said first rigid member and is spaced apart from said second rigid member;
   said inner member is joined to said second rigid member; and
   movement of said inner member with respect to said second member and said outer member is limited so that in said second configuration said inner member remains joined to said second rigid member and said outer member.

5. The apparatus defined in claim 4 wherein said inner member of said joining means is fixed to said second rigid member so that pulling of said second rigid member results in pulling of said inner member, and said limited movement of said inner member with respect to said outer member results in pulling said outer member when said inner member is pulled.

6. The apparatus defined in claim 1 wherein said rigid members include a first rigid member at one end of said compact unit having a radiotelephone microphone, and a second rigid member at the other end of said compact unit having a radiotelephone speaker.

7. The apparatus defined in claim 1 wherein said flexible member is nonmovably attached to said first end of said compact unit and slidably attached to said second end of said compact unit so that when said compact unit is expanded into said second configuration, said end of said flexible member joined to said second end of said compact unit moves closer to said first end of said compact unit.

8. The apparatus defined in claim 1 wherein said flexible member is taut when said apparatus is in said second configuration.

9. The apparatus defined in claim 8 wherein said flexible member is spaced apart from said rigid members when said apparatus is in said second configuration, thereby adding depth to said apparatus.

10. The apparatus defined in claim 1 wherein the length of said apparatus when in said second configuration is at least twice the length of said apparatus when in said first configuration.

11. The apparatus defined in claim 1 wherein the length of said flexible member is twice the length of said compact unit formed by said rigid members in said first configuration.

* * * * *